(12) United States Patent
Yamaguchi

(10) Patent No.: US 8,327,633 B2
(45) Date of Patent: Dec. 11, 2012

(54) EXHAUST PIPE FOR VEHICLE-MOUNTED ENGINE

(75) Inventor: Junichi Yamaguchi, Kasugai (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 296 days.

(21) Appl. No.: 12/600,979

(22) PCT Filed: May 9, 2008

(86) PCT No.: PCT/JP2008/058600
§ 371 (c)(1),
(2), (4) Date: Nov. 19, 2009

(87) PCT Pub. No.: WO2008/143023
PCT Pub. Date: Nov. 27, 2008

(65) Prior Publication Data
US 2010/0170231 A1      Jul. 8, 2010

(30) Foreign Application Priority Data

May 21, 2007   (JP) ................................ 2007-134279

(51) Int. Cl.
*F01N 3/02*           (2006.01)

(52) U.S. Cl. ................. 60/309; 60/299; 60/322; 60/324

(58) Field of Classification Search .................... 60/297, 60/309, 311, 324, 322
See application file for complete search history.

(56) References Cited

U.S. PATENT DOCUMENTS 7,500,356 B2 *   3/2009   Hirata et al. .................... 60/286
7,784,273 B2 *   8/2010   Kanaya et al. .................. 60/286

FOREIGN PATENT DOCUMENTS

| EP | 0953741 A1 | 11/1999 |
| JP | 57-193710 A | 11/1982 |
| JP | 58-22966 U | 2/1983 |

(Continued)

OTHER PUBLICATIONS

German Office Action dated Sep. 6, 2011, issued in corresponding German Patent Application No. 11 2008 001 343.8.

*Primary Examiner* — Thomas Denion
*Assistant Examiner* — Diem Tran
(74) *Attorney, Agent, or Firm* — Sughrue Mion, PLLC

(57) ABSTRACT

An exhaust pipe for a vehicle-mounted engine. An inner pipe inserted in an outer pipe contacts, at its outer end, with the inner peripheral surface of the outer pipe at a first position, the outer pipe contacts the inner pipe at a second position different from the first position, and thus an expansion chamber is formed between the inner pipe the outer pipe. The inner pipe includes a plurality of communication holes for communicating the inside of the inner pipe and the expansion chamber, thereby forming a muffler. An exhaust gas purification catalyst is provided within the outer pipe adjacent to the expansion chamber. On the inner peripheral surface of the outer pipe, a weir for stopping condensed water is provided between the outer end of the inner pipe and the exhaust gas purification catalyst. Consequently, in the exhaust pipe, deterioration of the purification function of the exhaust gas purification catalyst caused by contact of condensed water, which is produced when exhaust gas is cooled, with the exhaust gas purification catalyst can be suppressed.

8 Claims, 6 Drawing Sheets

FOREIGN PATENT DOCUMENTS

| | | |
|---|---|---|
| JP | 5-32713 U | 4/1993 |
| JP | 10-252442 A | 9/1998 |
| JP | 10-315791 A | 12/1998 |
| JP | 11-081999 A | 3/1999 |
| JP | 11-082008 A | 3/1999 |
| JP | 11-342753 A | 12/1999 |
| JP | 2004-132320 A | 4/2004 |
| JP | 2004-162702 A | 6/2004 |

* cited by examiner

EXHAUST PIPE FOR VEHICLE-MOUNTED ENGINE

FIELD OF THE INVENTION

The present invention relates to an exhaust pipe for a vehicle-mounted engine in which a muffler and an exhaust gas purification catalyst are disposed adjacent to each other.

BACKGROUND OF THE INVENTION

A conventional exhaust pipe for a vehicle-mounted engine in which a muffler and an exhaust gas purification catalyst are disposed adjacent to each other is described, for example in Patent Document 1. FIG. 1 also illustrates such conventional exhaust pipe for a vehicle-mounted engine.

As illustrated in FIG. 1, an exhaust pipe 1 includes an outer pipe 10 and an inner pipe 31. An exhaust gas purification catalyst 21, which is provided in an exhaust system of a vehicle-mounted engine to purify exhaust gas, contacts the outer pipe 10 inside the outer pipe 10. An inner pipe 31 is provided within the outer pipe 10 to be located adjacent to the exhaust gas purification catalyst 21 on the downstream side of exhaust gas with respect to the exhaust gas purification catalyst 21. The inner pipe 31 includes a separator 32 having a tapered portion 32A, a diameter of which is reduced toward the downstream side of exhaust gas, and a linear inside pipe 33 connected to the separator 32 on the downstream side of exhaust gas. An end 32C of the separator 32 located on upstream side of exhaust gas is partly and fixedly attached to the inner peripheral surface of the outer pipe 10, for example by spot welding, in the circumferential direction of the end 32C. A part of the inside pipe 33 located on the downstream side of exhaust gas contacts the end 13 of the outer pipe 10 on the downstream side of exhaust gas inside the outer pipe 10 via a wire mesh 34 to absorb the difference in heat expansions between the inside pipe 33 and the outer pipe 10. This allows the inside pipe 33 to move relative to the outer pipe 10 in the axial direction of the inside pipe 33. The outer peripheral surface of the inner pipe 31 (i.e., the separator 32 and the inside pipe 33) and the corresponding inner peripheral surface of the outer pipe 1 define an expansion chamber 35. The temperature and pressure of exhaust gas introduced into the inside pipe 33 via the separator 32 are decreased when exhaust gas flows out to the expansion chamber 35 through a plurality of communication holes 33A that are formed in the inside pipe 33. Thus, in the exhaust pipe 1, the outer pipe 10 and the inner exhaust gas purification catalyst 21 within the outer pipe 10 serve as a catalyst device 2 and the outer pipe 10 and the inner pipe 31 serve as a muffler 3.

In the exhaust pipe 1, as described above, the catalyst device 2 and the muffler 3 are integrally formed of the same outer pipe 10. This enables the reduction in steps of manufacture and reduction in the number of parts, compared with the exhaust pipe in which a catalyst device and a muffler are formed of different outer pipes. In addition, the entire length of the exhaust pipe 1 can be shortened, which improves the mounting of the exhaust pipe 1 in a vehicle.

In the muffler 3 of the exhaust pipe 1, exhaust gas introduced into the inside pipe 33 via the separator 32 is flown out to the expansion chamber 35 through the communication holes 33A. In this situation, water vapor contained in the exhaust gas is cooled down by contacting the inner peripheral surface of the outer pipe 10 to turn into condensed water to be accumulated in the expansion chamber 35. Meanwhile, since the separator 32 and the outer pipe 10 are only partly attached fixedly in their circumferential directions, there is a gap between them. Thus, it may occur that a part of condensed water in the expansion chamber 35 flows out toward exhaust gas purification catalyst 21 between the separator 32 and the outer pipe 10 to contact the exhaust gas purification catalyst 21. If the condensed water contacts the exhaust gas purification catalyst 21, the temperature of the exhaust gas purification catalyst 21 would rapidly decrease to generate heat shock or the exhaust gas purification catalyst 21 would be chemically changed, which may result in deterioration of purification function of the exhaust gas purification catalyst 21. This tendency becomes prominent not only in the configuration where the outer pipe and the end of the inner pipe that contacts the inner peripheral surface of the outer pipe are partly and fixedly attached in their circumferential directions but also in the configuration where the end of the inner pipe contacts the outer pipe in the outer pipe via a wire mesh.

Patent Document 1: Japanese Laid-Open Patent Publication No. 2004-132320

SUMMARY OF THE INVENTION

It is an object of the present invention to provide an exhaust pipe for a vehicle-mounted engine in which deterioration of the purification function of the exhaust gas purification catalyst caused by contact of condensed water, which is produced when exhaust gas is cooled, with the exhaust gas purification catalyst can be suppressed.

In the first aspect, an exhaust pipe for a vehicle-mounted engine is provided. The exhaust pipe includes an outer pipe having an inner peripheral surface, an inner pipe inserted in the outer pipe, wherein the inner pipe has an end and a plurality of communication holes, an expansion chamber, an exhaust gas purification catalyst disposed in the outer pipe adjacent to the expansion chamber, and a weir for stopping flow of condensed water. The expansion chamber is formed between the inner pipe and the outer pipe by contacting the inner pipe with the inner peripheral surface of the outer pipe at the end of the inner pipe inside the outer pipe, and contacting the outer pipe with the inner pipe at the position different from the contact position in the axial direction of these pipes. The expansion chamber communicates with the interior of the inner pipe via the plurality of communication holes to form a muffler. The weir is provided on the inner peripheral surface of the outer pipe between the end of the inner pipe and the exhaust gas purification catalyst.

The weir may be formed by protruding a part of the outer pipe inward the outer pipe.

The weir may be formed over the entire circumference of the outer pipe.

The exhaust gas purification catalyst may be located on the upstream side of exhaust gas with respect to the expansion chamber and may be fixed to the inner peripheral surface of the outer pipe with a holding member. The height of the weir in the vertical direction of the weir may be greater than the thickness of the holding member.

The weir may have an inclined portion which inclines inward the outer pipe on the downstream side of exhaust gas.

A portion of the inner pipe on the upstream side of exhaust gas has a tapered portion, a diameter of which is reduced toward the downstream side of exhaust gas. The weir is formed so that the inclined surface of the inclined portion is located on the extended plane of the inner peripheral surface of the tapered portion.

In the second aspect, an exhaust pipe for a vehicle-mounted engine is provided. The exhaust pipe includes an outer pipe having an inner peripheral surface, an inner pipe inserted in the outer pipe, wherein the inner pipe has a plurality of communication holes, an expansion chamber, an exhaust gas purification catalyst disposed adjacent to the expansion chamber in the outer pipe, and a weir for stopping flow of condensed water. The expansion chamber is formed between the inner pipe and the outer pipe by contacting the inner pipe with the inner peripheral surface of the outer pipe inside the outer pipe, and contacting the outer pipe with the inner pipe at the position different from the contact position in the axial direction of these pipes. The expansion chamber communicates with the interior of the inner pipe via the plurality of communication holes to form a muffler. The weir is provided between the expansion chamber and the exhaust gas purification catalyst on the inner peripheral surface of the outer pipe. The weir protrudes inward the outer pipe and contacts the inner pipe.

The weir may be formed by protruding a part of the outer pipe inward the outer pipe.

The first protruding portion of the circumferential side of the weir may be greater than the corresponding second protruding portion.

A central axis of the part of the outer pipe, in which the exhaust gas purification catalyst is provided, and the central axis of the part of the outer pipe, with which the inner pipe contacts inside the outer pipe, may cross each other.

DETAILED DESCRIPTION OF THE PREFERRED EMBODIMENTS

An exhaust pipe for a vehicle-mounted engine including a sub-muffler and an exhaust gas purification catalyst disposed adjacent to each other according to the first embodiment of the invention will be described with reference to FIGS. 2 and 3.

Figure 1:
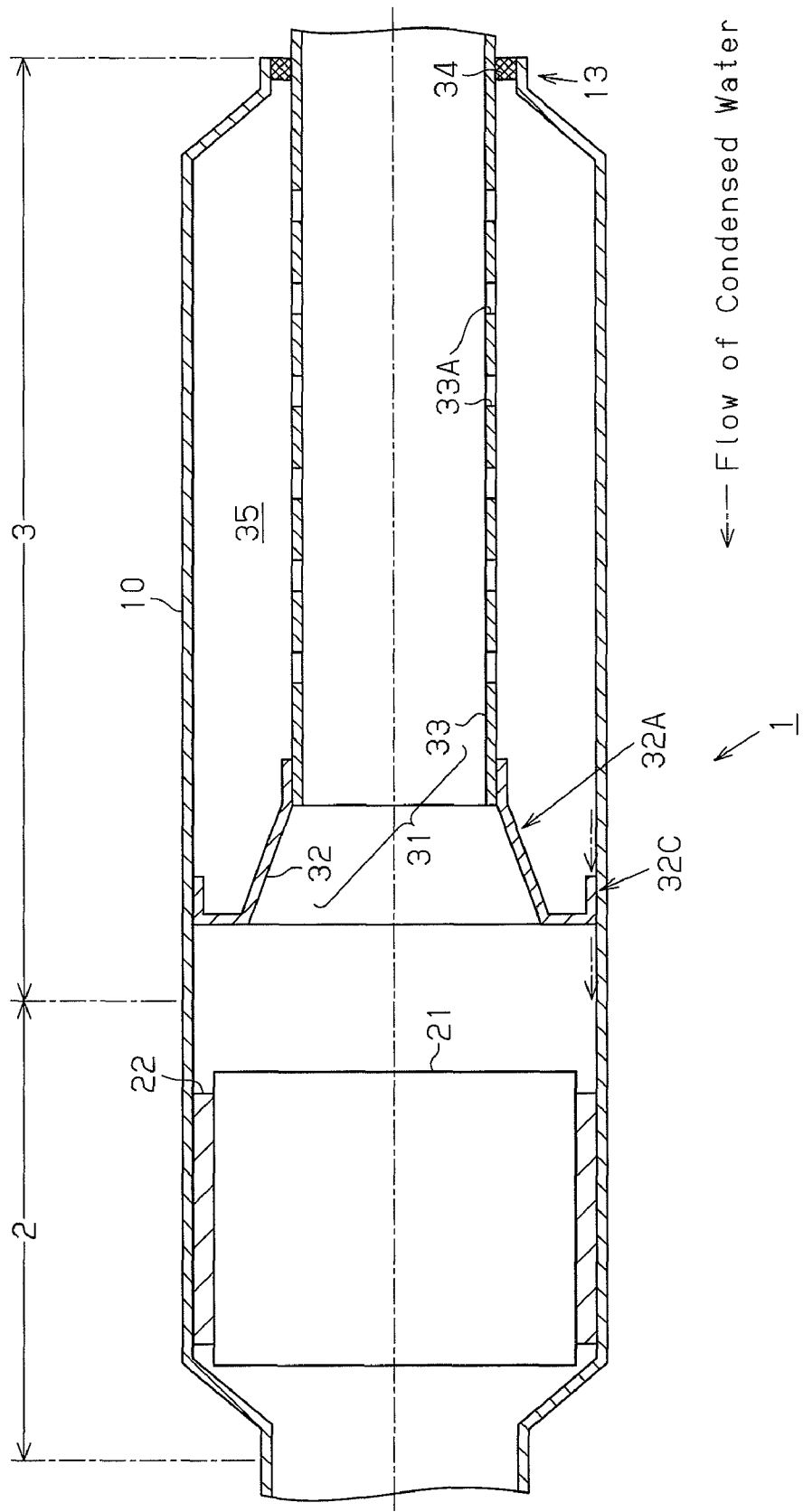
FIG. 1 is a cross-sectional view illustrating a conventional exhaust pipe for a vehicle-mounted engine.
Figure 2:
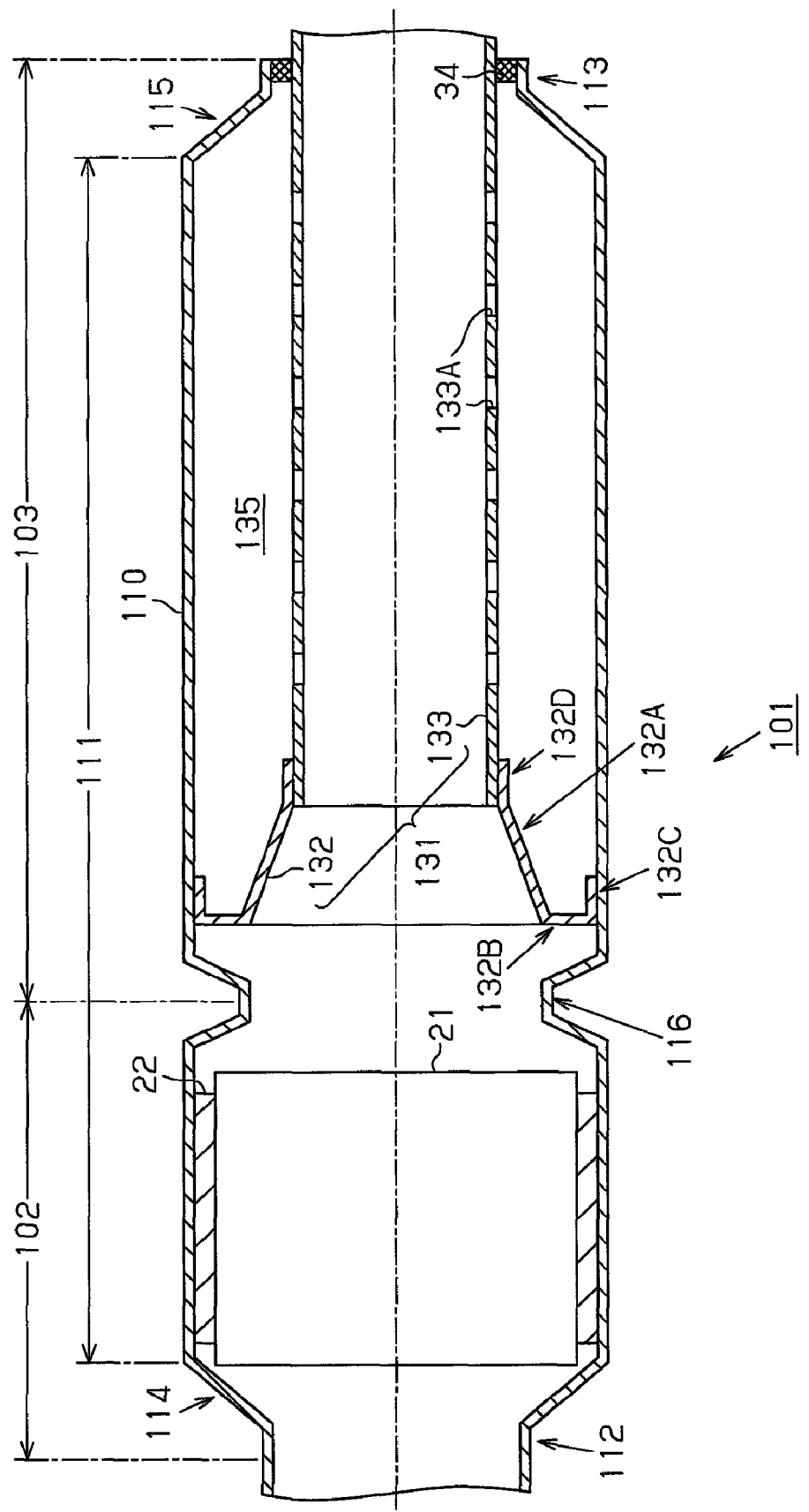
FIG. 2 is a cross-sectional view illustrating an exhaust pipe for a vehicle-mounted engine according to a first embodiment of the invention.

FIG. 2 is a cross-sectional view illustrating the exhausting pipe of the first embodiment, compared with FIG. 1.

As illustrated in FIG. 2, an exhaust pipe 101 includes an outer pipe 110 and an inner pipe 131. An exhaust gas purification catalyst 21, which is provided in an exhaust system of a vehicle-mounted engine to purify exhaust gas, contacts the outer pipe 110 inside the outer pipe 110. The inner pipe 131 is disposed adjacent to the exhaust gas purification catalyst 21 on the downstream side of exhaust gas in the outer pipe 110.

The outer pipe 110 includes body portion 111 in the form of generally linear tube, an upstream-side reduced portion 114, the diameter of which is gradually reduced from the body portion 111 to the upstream end 112 located on the upstream side of exhaust gas, a downstream-side reduced portion 115, the diameter of which is gradually reduced from the body portion 111 to the downstream end 113 located on the downstream side of exhaust gas.

The inner pipe 131 includes a separator 132, the diameter of which is gradually reduced toward the downstream of exhaust gas, and a linear inside pipe 133 connected with the separator 132 on the downstream side of exhaust gas.

The separator 132 includes a tapered portion 132A the diameter of which is reduced toward the downstream of exhaust gas, a vertical portion 132B that extends from the upstream end of the tapered portion 132A radially outwardly to the inner peripheral surface of the outer pipe 110, an outer end 132C which is fold over to the downstream side of exhaust gas from the contacting portions of the vertical portion 132B and the inner peripheral surface of the outer pipe 110 and which extends along the inner peripheral surface of the outer pipe 110, and a connecting portion 132D to which the inside pipe 133 is connected. The outer end 132C of the separator 132 is partly and fixedly attached to the inner peripheral surface of the outer pipe 110 in the circumferential direction of the outer end 132C by spot welding.

A part of the inside pipe 133 on the downstream side of exhaust gas contacts the downstream end 113 of the outer pipe 110 in the outer pipe 110 via a wire mesh 34. The inside pipe 133 is movable relative to the outer pipe 110 in the axial direction of inside pipe 133. A plurality of communication holes 133A are formed in the inside pipe 133. An expansion chamber 135 is also formed between the outer peripheral surface of the inner pipe 131 (i.e., the separator 132 and the inside pipe 133) and the opposing inner peripheral surface of the outer pipe 110. The interior of the inside pipe 133 and the interior of the expansion chamber 135 communicate with each other through the communication holes 133A.

The exhaust gas purification catalyst 21 is fixed to the inner peripheral surface of the outer pipe 110 via the holding member 22. A weir 116 is provided on the inner peripheral surface of the outer pipe 110 between the outer end 132C of the separator 132 and the exhaust gas purification catalyst 21. The weir 116 serves to stop condensed water from flowing toward the exhaust gas purification catalyst 21 between the outer end 132C and the inner peripheral surface of the outer pipe 110, and it is required that the weir 116 is formed at the portion which is located lower side of the exhaust pipe 101 in the vertical direction. In this embodiment, the weir 116 is formed by protruding a portion of the body portion 111 inward the body portion 111 over the entire circumference of the body portion 111.

Figure 3:
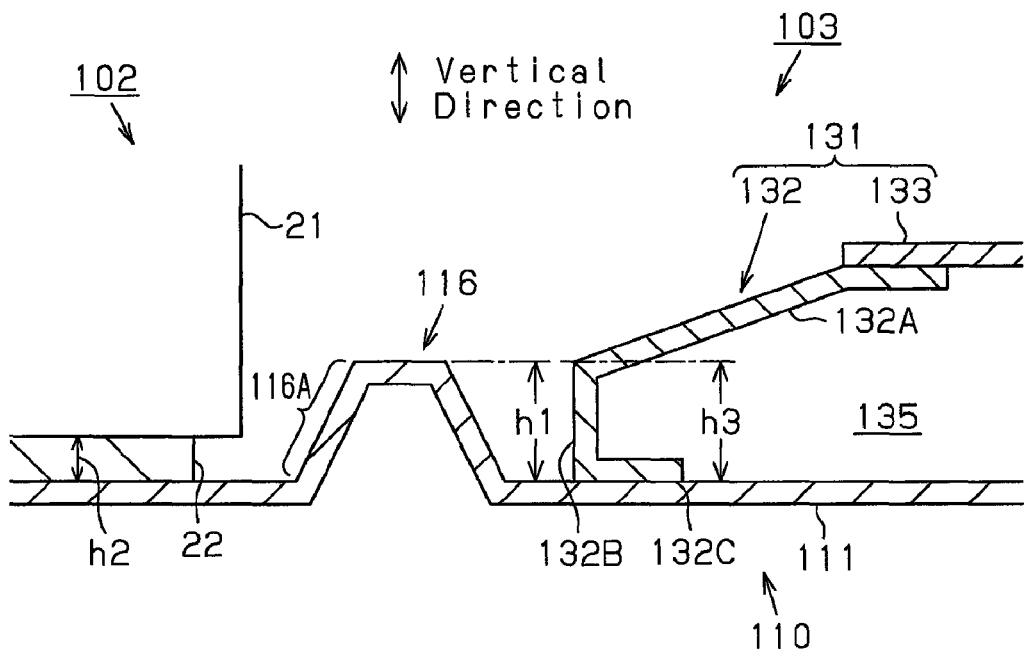
FIG. 3 is an enlarged cross-section of FIG. 2 near the weir.

FIG. 3 is an enlarged cross-section of FIG. 2 around the weir 116. As illustrated in FIG. 3, the weir 116 includes an inclined portion 116A which is inclined inward the outer pipe 110 on the downstream side of exhaust gas. The height h1 of the weir 116 in the vertical direction is greater than the thickness h2 of the holding member 22, and the same as the height h3 of the vertical portion 132B of the separator 132 in the vertical direction.

The outer pipe 110 and the exhaust gas purification catalyst 21 in the outer pipe 110 serve as a catalyst device 102 and the outer pipe 110 and the inner pipe 131 in the outer pipe 110 serve as a sub-muffler 103.

The exhaust pipe for a vehicle-mounted engine according to the first embodiment as described above has the following advantages.

(1) On the inner peripheral surface of the outer pipe 110, the weir 116 for stopping flow of the condensed water is provided between the outer end 132C of the separator 132 and the exhaust gas purification catalyst 21. Accordingly, even if a portion of the condensed water accumulated in the expansion chamber 135 flows out of between the outer end 132C and the inner peripheral surface of the outer pipe 110 toward the exhaust gas purification catalyst 21, the weir 116 stops such flow. Since the contact of condensed water with the exhaust gas purification catalyst 21 is inhibited, deterioration of purification function of the exhaust gas purification catalyst 21 caused by the contact can be suppressed.

(2) The weir 116 is formed by protruding a portion of the outer pipe 110 inward the outer pipe 110. Since the weir 116 is a part of the outer pipe 110, the configuration can be simpler compared with the configuration where the weir 116 and the outer pipe 110 are formed of separate members.

(3) The weir 116 is formed over the entire circumference of the outer pipe 110. Thus, even if the attitude of the exhaust pipe 101 is varied depending on the driving status of vehicle, the weir 116 can stop the flow of condensed water that flows out toward the exhaust gas purification catalyst 21 between the outer end 132C and the inner peripheral surface of the outer pipe 110, resulting in advantageous suppression of the contact of condensed water with the exhaust gas purification catalyst 21.

(4) The height h1 of the weir 116 in the vertical direction is greater than the thickness h2 of the holding member 22. Thus, a part of exhaust gas that passed through the exhaust gas purification catalyst 21 impacts on the weir 116 to cause the weir 116 to be heated. Then, condensed water the flow of which was stopped with the weir 116 is actively vaporized by heat of the weir 116, resulting in advantageous suppression of the contact of condensed water with the exhaust gas purification catalyst 21.

(5) When a part of exhaust gas that passed through the exhaust gas purification catalyst 21 impacts on the weir 116, it is likely that the flow of exhaust gas is disturbed as well as abnormal noise is generated. In this embodiment, however, the weir 116 includes the inclined portion 116A which is inclined inward the outer pipe 110 on the downstream side of exhaust gas. Thus, the part of exhaust gas that passed through the exhaust gas purification catalyst 21 impacts on the weir 116 flows smoothly in the direction downstream of exhaust gas along the inclined portion 116A of the weir 116. This configuration not only suppresses turbulence of the flow of exhaust gas but also suppresses generation of abnormal noise caused by such turbulence of the flow.

Next, an exhaust pipe for a vehicle-mounted engine according to a second embodiment of the invention will be described with reference to FIG. 4. The explanation different points from the first embodiment will be focused.

Figure 4:
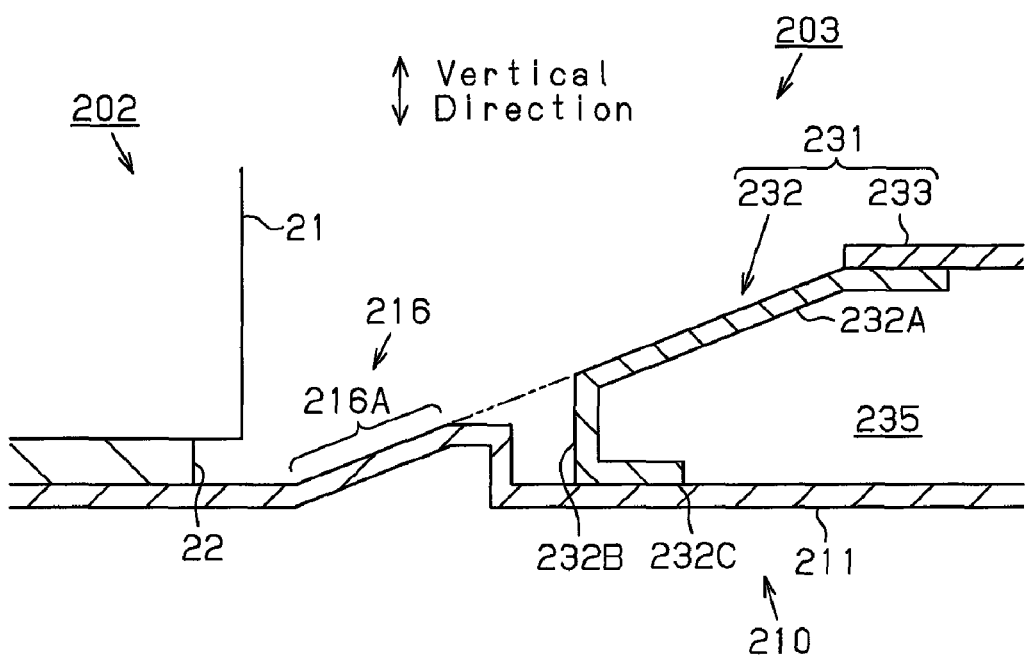
FIG. 4 is an enlarged cross-section of an exhaust pipe for a vehicle-mounted engine according to a second embodiment of the invention.

FIG. 4 is an enlarged cross-section of an exhaust pipe according to the second embodiment, corresponding to FIG. 3. In FIG. 4, the same or like elements as in FIG. 3 are denoted as the same or like numerals and explanation thereof is omitted.

As illustrated in FIG. 4, also in the second embodiment, a weir 216 is provided on the inner peripheral surface of an outer pipe 210 between an outer end 232C of the separator 232 and an exhaust gas purification catalyst 21. Similar to the first embodiment, the weir 216 includes an inclined portion 216A which inclines inward the outer pipe 210 on the downstream side of exhaust gas. However, in this embodiment, the weir 216 and the separator 232 formed so that the inclined surface of the inclined portion 216A is located on the extended plane of the inner peripheral surface of the tapered portion 232A of the separator 232.

The exhaust pipe for a vehicle-mounted engine according to the second embodiment as described above has the following advantage in addition to the advantages (1) to (5) of the first embodiment.

(6) The weir 216 is formed so that the inclined surface of the inclined portion 216A is located on the extended plane of the inner peripheral surface of the tapered portion 232A of the separator 232. Thus, among exhaust gas that passed through the exhaust gas purification catalyst 21, exhaust gas that flows along the inclined portion 216A of the weir 216 flows smoothly along the inner peripheral surface of the tapered portion 232A of the separator 232. This can suppress turbulence of flow of exhaust gas caused by provision of the weir 216 and thus suppress generation of abnormal noise caused by such turbulence.

The exhaust pipes for a vehicle-mounted engine according to the present invention are not limited to those of the above embodiments but can be modified as in the following embodiments.

The height h1 of the weir in the vertical direction may be shorter than the thickness h2 of the holding member. Even in this case, the weir can stop the flow of condensed water flowing out to exhaust gas purification catalyst 21 from between the outer end 132O of the separator 132 and the inner peripheral surface of the outer pipe 110 so that the contact of condensed water with the exhaust gas purification catalyst 21 can be suppressed.

Instead of fixing the exhaust gas purification catalyst 21 to the inner peripheral surface of the outer pipe 110, 210 via the holding member 22, the exhaust gas purification catalyst 21 may be fixed directly on the inner peripheral surface of the outer pipe 110, 210.

The tapered portion 132A, 232A of the inner pipe 131, 231 may be omitted.

Instead of forming the separator 132, 232 and the inside pipe 133, 233 separately, the separator and the inside pipe may be formed integrally.

The number of the exhaust gas purification catalyst 21 may not be limited to one, and a plurality of adjacent exhaust gas purification catalysts are also applicable.

The muffler that constitutes the exhaust pipe 10 is not limited to a sub-muffler, and a main muffler is also applicable.

The position of the exhaust gas purification catalyst and the muffler is not limited to the position where the exhaust gas purification catalyst is located on the upstream side of exhaust gas and the muffler is located on the downstream side of exhaust gas. Alternatively, the muffler may be located on the upstream side of exhaust gas and the exhaust gas purification catalyst may be located on the downstream side of exhaust gas.

Figure 5:
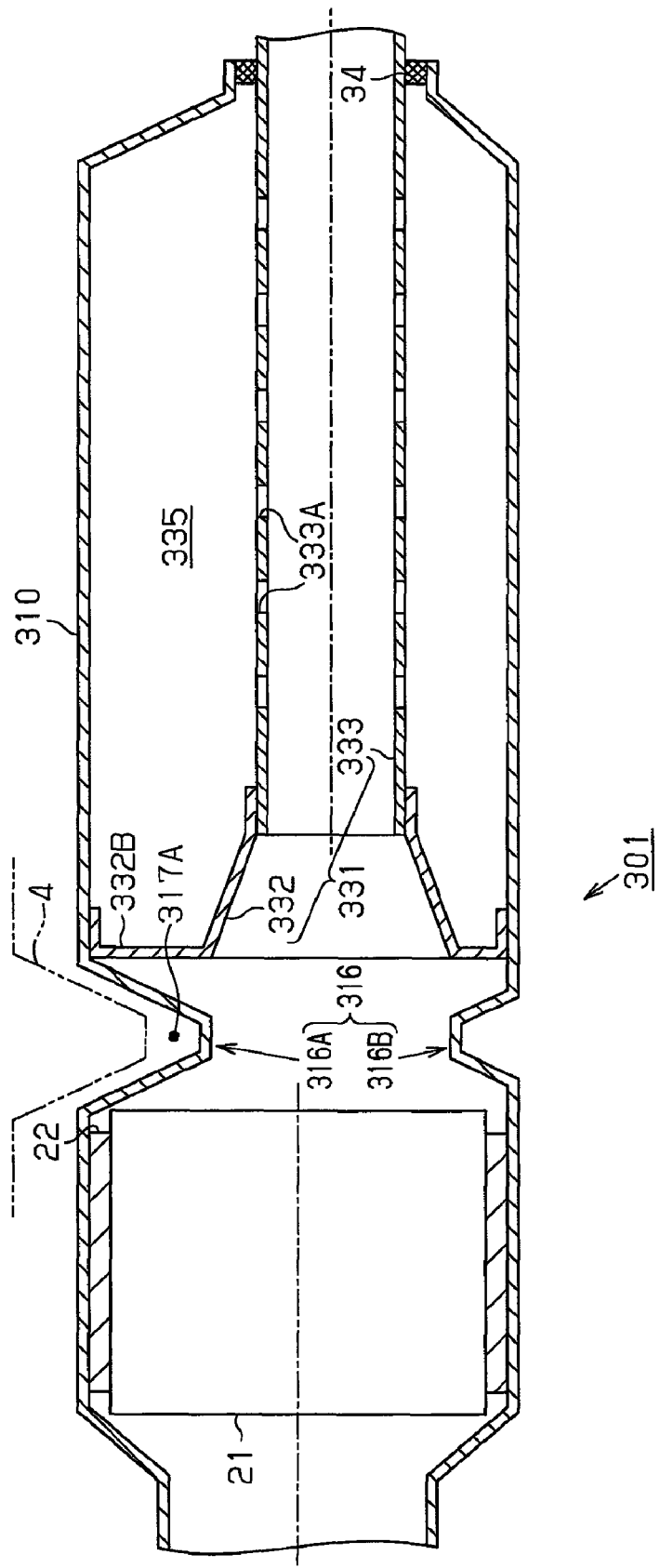
FIG. 5 is a cross-sectional view of an exhaust pipe for a vehicle-mounted engine according to another embodiment.

The shape of the weir 116, 216 in the circumferential direction thereof may be non-uniform. For example, as illustrated in FIG. 5, the vertically upper portion 316A of the weir 316 may be larger than the vertically lower portion 316B in the circumferential direction. Thus, a relatively greater recess 317A can be formed at the portion corresponding to the vertically upper portion 316A, out of the outer circumference of the outer pipe 310. By attaching the exhaust pipe 310 to the vehicle such that a lower protruding portion 4 of the vehicle such as a cross member is contained in the recess 317A, the mounting of the exhaust pipe 301 in a vehicle can be improved. Further, as illustrated in FIG. 5, by forming the vertically upper portion of the vertical portion 332B of the separator 332 longer corresponding to the shape of the weir 316, turbulence of the flow of exhaust gas caused by enlargement of the vertically upper portion 316A of the weir 316 can be suppressed.

Figure 6:
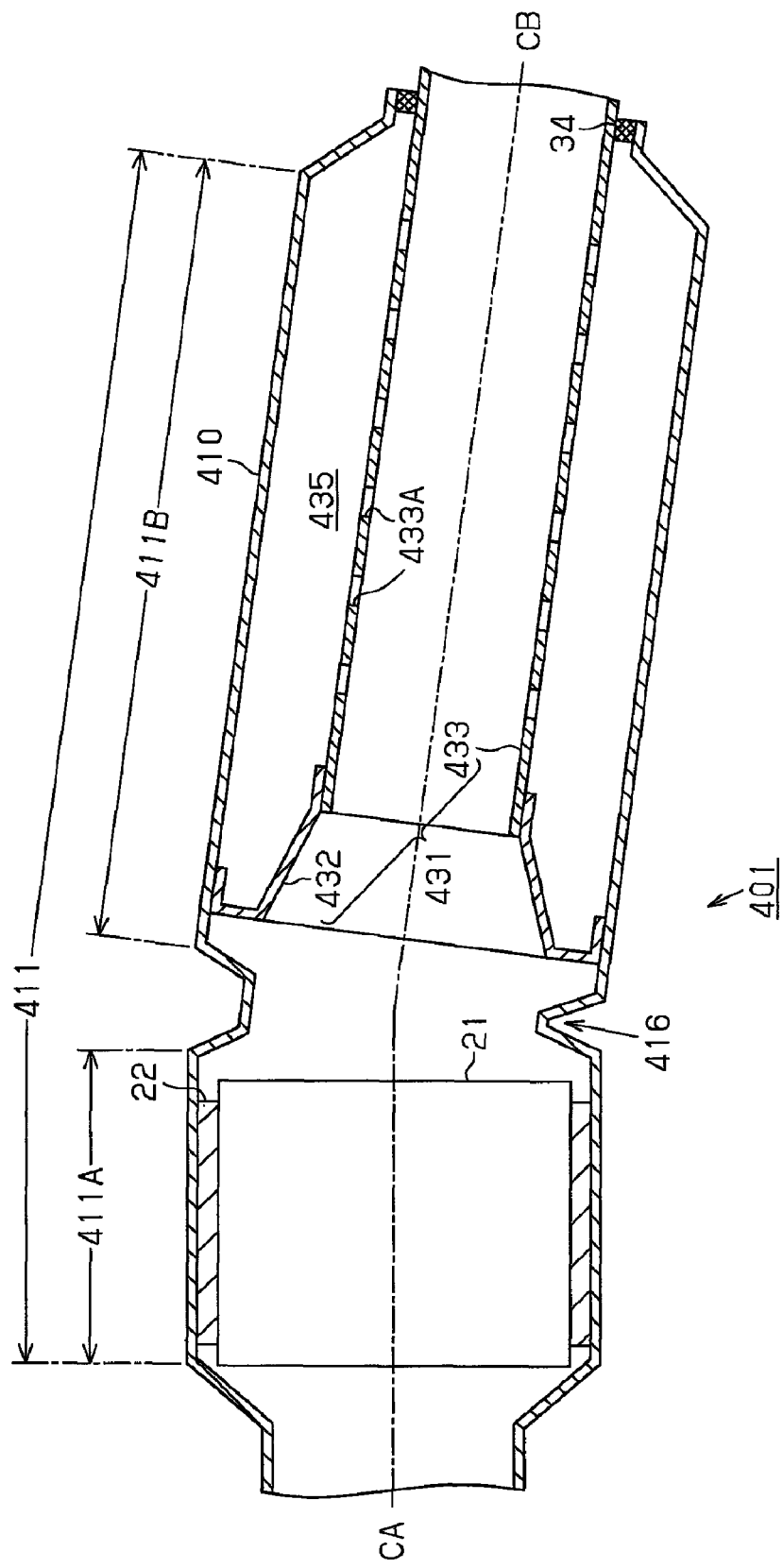
FIG. 6 is a cross-sectional view of an exhaust pipe for a vehicle-mounted engine according to yet another embodiment.

The shape of the body portion of the outer pipe is not limited to the linear body portion 111, 211. For example, as illustrated in FIG. 6, an outer pipe 410 may be formed so that the center axis CA of a catalyst-side body portion 411A to which the exhaust gas purification catalyst 21 contacts and the center axis CB of an inner pipe-side body portion 411B to which the inner pipe 431 contacts cross each other.

The contact of the outer pipe with the end of the inner pipe is not limited to the one where the outer pipe and the end of the inner pipe which contacts the inner peripheral surface of the outer pipe are partly and fixedly attached in their circumferential directions. For example, the end of the inner pipe may contact the outer pipe via a wire mesh.

Instead of forming the weir of a part of the outer pipe 110, 210, the weir may be formed of a separate member from the outer pipe 110, 210.

Figure 7:
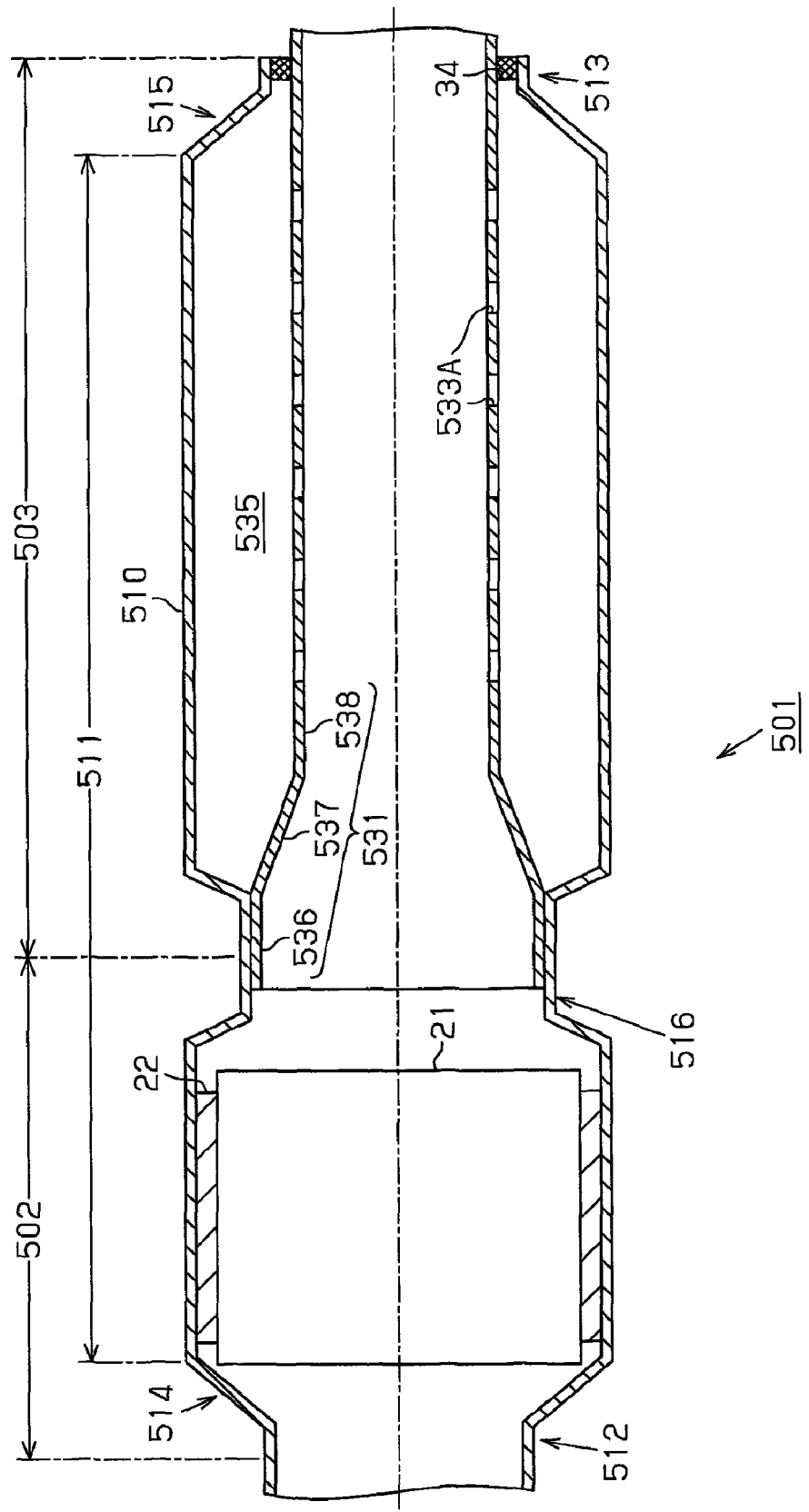
FIG. 7 is a cross-sectional view of an exhaust pipe for a vehicle-mounted engine according to still another embodiment.

The configuration of the exhaust pipe is not limited to the one where the weir is provided on the inner peripheral surface of the outer pipe between the end of the inner pipe which contacts the inner peripheral surface of the outer pipe and the exhaust gas purification catalyst 21. For example, the configuration as illustrated in FIG. 7 is applicable. As shown, a weir 516 for stopping the flow of condensed water is provided on the inner peripheral surface of an outer pipe 510 between the expansion chamber 535 and the exhaust gas purification catalyst 21 to protrude inward the outer pipe 510 while the inner pipe 531 contacts the weir 516. The inner pipe 531 includes a contact portion 536 that contacts the inner peripheral surface of the weir 516, a reduced portion 537 that is connected to the end of the contact portion 536 on the downstream side of exhaust gas and the diameter of which is reduced toward the downstream side of exhaust gas, and a linear portion 538 that is connected to the end of the reduced portion 537 on the downstream side of exhaust gas. The weir 516 can also stop the movement of a part of condensed water accumulated in the expansion chamber 535 toward the exhaust gas purification catalyst, thereby suppressing the contact of condensed water with the exhaust gas purification catalyst 21. Although the weir 516 is formed by a part of the outer pipe 510 that protrudes inward the outer pipe 510 in this embodiment, the weir and the outer pipe 510 may be formed of separate members.

The invention claimed is:

1. A exhaust pipe for a vehicle-mounted engine comprising:
   an outer pipe including an inner peripheral surface;
   an inner pipe inserted in the outer pipe, wherein the inner pipe includes an end and a plurality of communication holes;
   an expansion chamber that is formed between the outer pipe and the inner pipe by contacting the inner pipe with the inner peripheral surface of the outer pipe at the end of the inner pipe and contacting the outer pipe with the inner pipe at the position different from the contact position of the inner pipe with the inner peripheral surface of the outer pipe in the axial direction of the outer and inner pipes, wherein the expansion chamber communicates with the interior of the inner pipe via the plurality of communication holes to form a muffler;
   an exhaust gas purification catalyst provided within the outer pipe adjacent to the expansion chamber; and
   a weir for stopping the flow of condensed water provided on the inner peripheral surface of the outer pipe between the end of the inner pipe and the exhaust gas purification catalyst so as to protrude inward the outer pipe.

2. The exhaust pipe for a vehicle-mounted engine of claim 1, wherein the weir is formed by protruding a part of the outer pipe inward the outer pipe.

3. The exhaust pipe for a vehicle-mounted engine of claim 1, wherein the weir is formed over the entire circumference of the outer pipe.

4. The exhaust pipe for a vehicle-mounted engine of claim 1, wherein the exhaust gas purification catalyst is located on the upstream side of exhaust gas with respect to the expansion chamber, and fixed to the inner peripheral surface of the outer pipe with a holding member,
   wherein the height of the weir in the vertical direction of the weir is greater than the thickness of the holding member.

5. The exhaust pipe for a vehicle-mounted engine of claim 4, wherein the weir has an inclined portion which inclines inward the outer pipe on the downstream side of exhaust gas.

6. The exhaust pipe for a vehicle-mounted engine of claim 5, wherein a portion of the inner pipe on the upstream side of exhaust gas has a tapered portion a diameter of which is reduced toward the downstream side of exhaust gas,
   wherein the weir is formed so that the inclined surface of the inclined portion is located on the extended plane of the inner peripheral surface of the tapered portion.

7. An exhaust pipe for a vehicle-mounted engine comprising:
   an outer pipe including inner peripheral surface;
   an inner pipe inserted in the outer pipe, wherein the inner pipe includes a plurality of communication holes;
   an expansion chamber that is formed between the outer pipe and the inner pipe by contacting the inner pipe with the inner peripheral surface of the outer pipe, and contacting the outer pipe with the inner pipe at the position different from the contact position of the inner pipe with the inner peripheral surface of the outer pipe in the axial direction of the outer and inner pipes, wherein the expansion chamber communicates with the interior of the inner pipe via the plurality of communication holes to form a muffler;
   an exhaust gas purification catalyst provided within the outer pipe adjacent to the expansion chamber; and
   a weir for stopping the flow of condensed water provided between the expansion chamber and the exhaust gas purification catalyst on the inner peripheral surface of the outer pipe, wherein the weir protrudes inward the outer pipe and the weir contacts the inner pipe.

8. The exhaust pipe for a vehicle-mounted engine of claim 7, wherein the weir is formed by protruding a part of the outer pipe inward the outer pipe.

* * * * *